(12) United States Patent
Weldon et al.

(10) Patent No.: US 7,011,076 B1
(45) Date of Patent: Mar. 14, 2006

(54) BIPOLAR VALVE HAVING PERMANENT MAGNET

(75) Inventors: Craig Andrew Weldon, Chatham (CA); Gary Everingham, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/949,665

(22) Filed: Sep. 24, 2004

(51) Int. Cl.
*F16K 31/02* (2006.01)

(52) U.S. Cl. .................. 123/516; 123/520; 251/65; 251/129.09

(58) Field of Classification Search .............. 123/516, 123/518, 519, 520; 251/65, 129.09, 129.15
See application file for complete search history.

(56) References Cited

U.S. PATENT DOCUMENTS

| | | | |
|---|---|---|---|
| 4,387,696 A * | 6/1983 | Yogo et al. ................. | 123/585 |
| 5,460,148 A | 10/1995 | Suzumura et al. .......... | 123/585 |
| 5,487,407 A * | 1/1996 | Eaker ......................... | 137/522 |
| 6,170,766 B1 | 1/2001 | Focke et al. ............. | 239/585.1 |
| 6,526,951 B1 | 3/2003 | Ishigaki et al. ............. | 123/519 |
| 6,581,904 B1 | 6/2003 | Watanabe et al. ...... | 251/129.17 |

OTHER PUBLICATIONS

U.S. Appl. No. Appl. 10/253,222, filed Sep. 24, 2002, Entitled "Unipolar Canister Purge Valve."

* cited by examiner

*Primary Examiner*—Thomas Moulis
(74) *Attorney, Agent, or Firm*—Pasquale Musacchio

(57) ABSTRACT

A solenoid for use in valves used in evaporative emission control systems, such as canister purge valves or vent solenoid valves. The solenoid includes a housing having an inlet port and an outlet port. The housing further includes a guide element having a bobbin section. A valve shaft is slidably mounted to the guide element, wherein the valve shaft includes a permanent magnet and a valve element. The valve element is movable between a closed position wherein the inlet port is closed and an open position wherein the inlet port is opened. A coil is formed on the bobbin adjacent the magnet. In use, the coil generates directional magnetic fields oriented to cause the magnet to be repelled to move the valve element to the open position and oriented to cause a magnetic attraction with the magnet to move the valve element to the closed position.

17 Claims, 3 Drawing Sheets

BIPOLAR VALVE HAVING PERMANENT MAGNET

FIELD OF THE INVENTION

This invention relates to evaporative emission control systems for internal combustion engines, and more particularly, to a valve having a bipolar coil for generating magnetic fields which interact with a permanent magnet to selectively open and close a valve element.

BACKGROUND OF THE INVENTION

Motor vehicles having an internal combustion engine typically include an evaporative emission control system which serves to reduce fuel vapor emissions. Such systems include a vapor collection canister having carbon or other material which serves to absorb fuel vapors that are generated within a motor vehicle fuel system. A canister purge valve is located between the canister and an engine intake manifold. The canister purge valve may be opened or closed to either place the canister in fluid communication with the engine intake manifold or to isolate the canister from the engine intake manifold, respectively. The canister is also connected to a vent solenoid valve which serves to place the canister in fluid communication with atmospheric air and to isolate the canister from atmospheric air.

Under the appropriate conditions, the canister is purged so that fuel vapors collected within the canister do not undesirably escape into the atmosphere. This is done by opening the canister purge valve and the vent solenoid valve, thus enabling vacuum generated by the engine to draw in atmospheric air through the canister and then draw out the fuel vapors from the canister as part of a process for purging the canister. The fuel vapors are then used in the normal combustion process. Alternatively, the vent solenoid valve is closed to isolate the canister from atmospheric air. This enables the performance of a selected on board diagnostic procedure for detecting whether there is a fuel vapor leak in the system that is above a predetermined level.

Conventional canister purge and vent solenoid valves include a solenoid and spring arrangement for moving a valve element between open and closed positions. During operation, the solenoid is energized so as to move the valve element to a desired position. The spring serves to return the valve element to its initial position when power to the solenoid is removed.

However, the use of such valves increases the amount of components needed and thus increases manufacturing and other costs. Therefore, there is a need for valves having a reduced number of components and which cost less to manufacture and assemble.

SUMMARY OF THE INVENTION

The invention is directed to a solenoid for use in valves used in evaporative emission control systems, such as canister purge valves or vent solenoid valves. The solenoid includes a housing having an inlet port and an outlet port. The housing further includes a guide element having a bobbin section. A valve shaft is slidably mounted to the guide element, wherein the valve shaft includes a permanent magnet and a valve element. The valve element is movable between a closed position wherein the inlet port is closed and an open position wherein the inlet port is opened. A coil is formed on the bobbin adjacent the magnet. In use, the coil generates a first directional magnetic field that is oriented to cause the magnet to be repelled to thus move the valve element to the open position. The coil also generates a second directional magnetic field that is oriented to cause a magnetic attraction with the magnet to move the valve element to the closed position.

The features of the invention believed to be novel are set forth with particularity in the appended claims. The invention itself, however, both as to organization and method of operation, may be best understood by reference to the following description taken in conjunction with accompanying drawings.

DETAILED DESCRIPTION OF THE INVENTION

Figure 1:
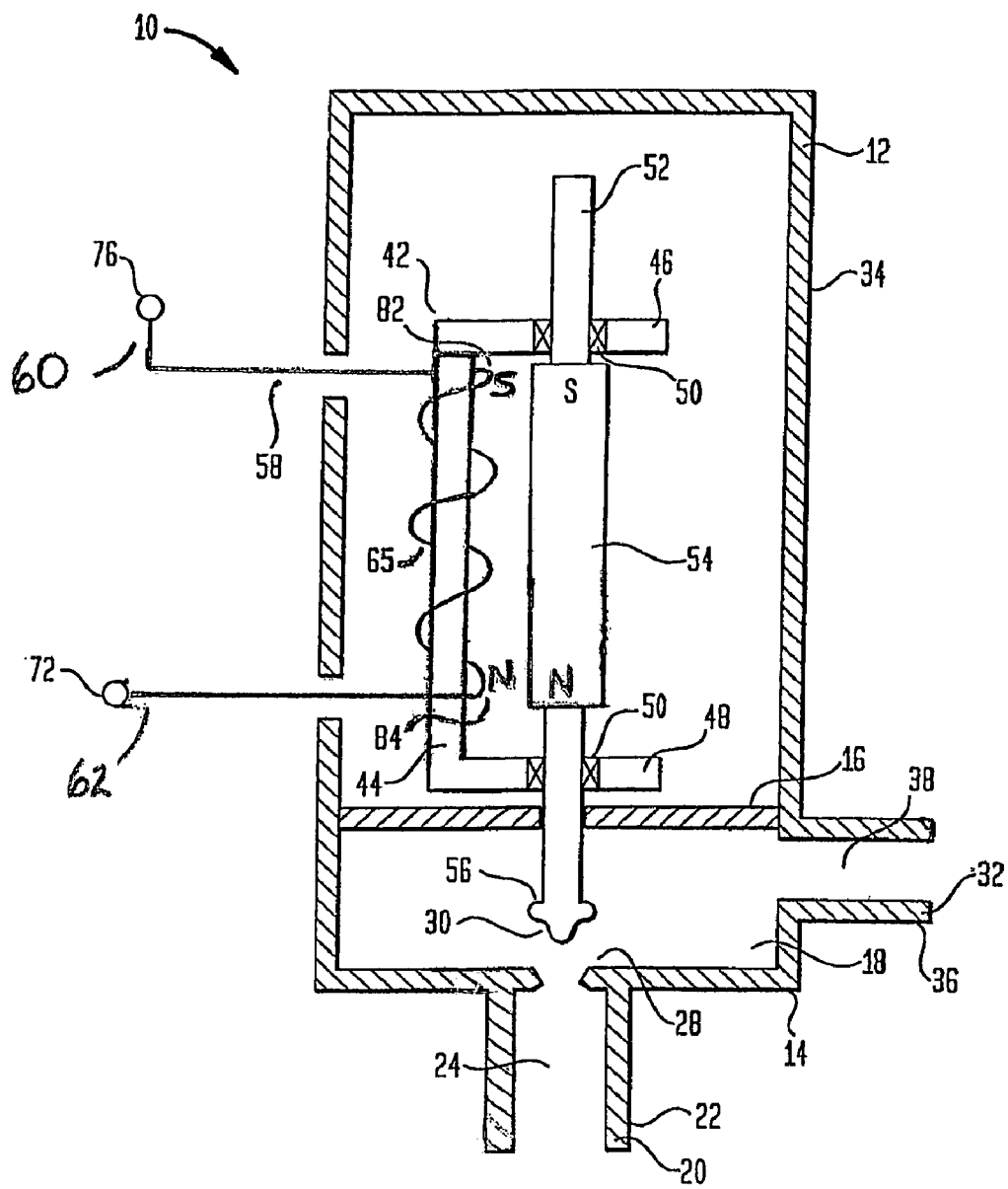
FIG. 1 is a cross sectional view of a bipolar canister purge valve having a coil which is energized for opening an inlet port.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of FIGS. 1–3.

Figure 3:
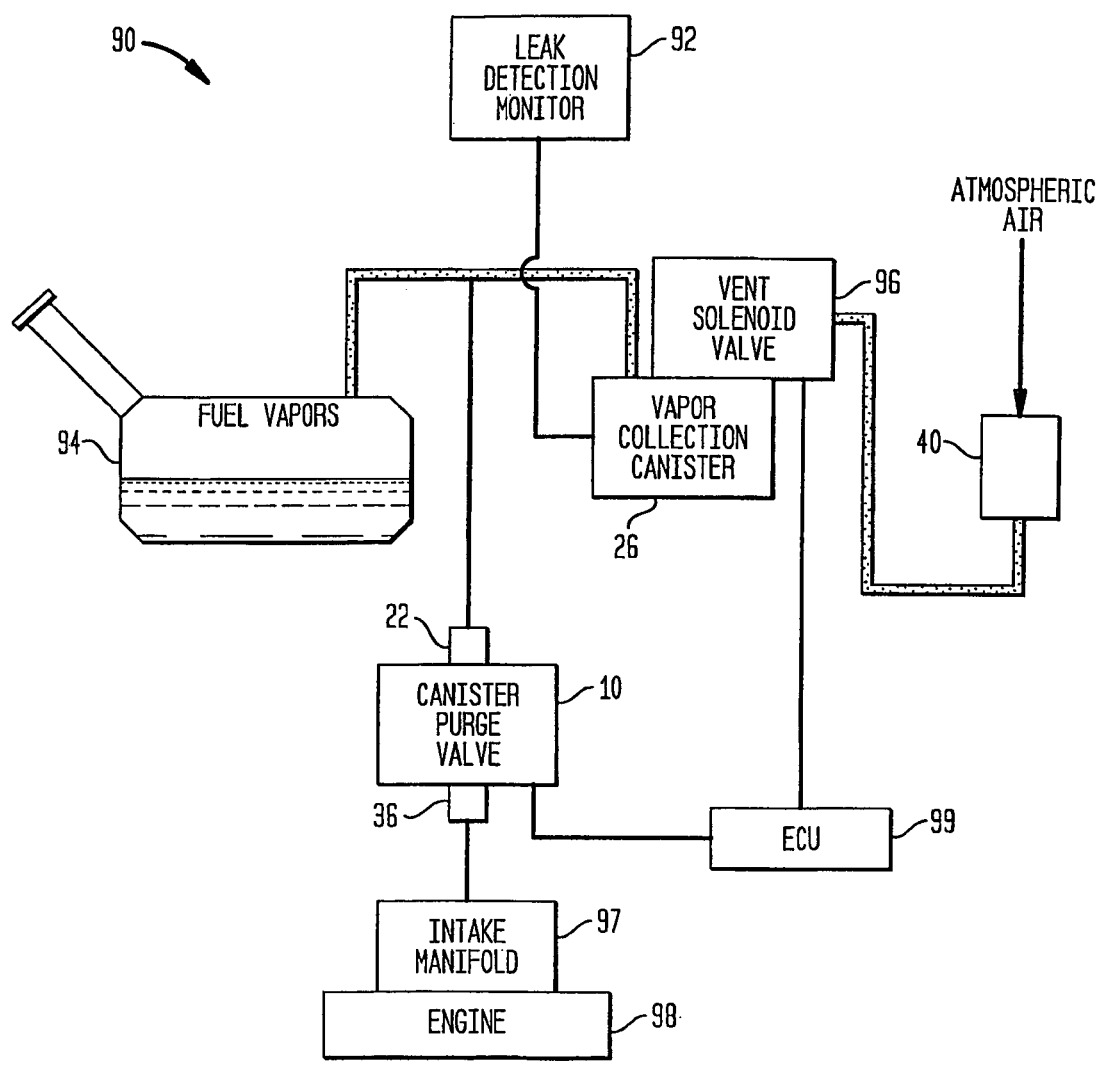
FIG. 3 is an illustrative depiction of the canister purge valve in an evaporative emission control system.

The principles of the present invention may be applied to either canister purge valves or vent solenoid valves. For purposes of clarity, the invention will be described in relation to a canister purge valve configuration although it is understood that the principles of the present invention are also applicable to vent solenoid valves. Referring to FIG. 1, a cross sectional view of a bipolar canister purge valve 10 in accordance with the present invention is shown. The purge valve 10 includes a housing 12 having a lower wall 14 and an internal wall 16 for forming an internal passageway 18. Inlet port walls 20 extend from the lower wall 14 to form an inlet port 22 having a first passageway 24 which is in fluid communication with a vapor collection canister 26 (FIG. 3). A valve seat 28 for receiving a valve element 30 is formed at the intersection of the inlet port walls 20 and the lower wall 14. Outlet port walls 32 extend from a side wall 34 of the housing 12 to form an outlet port 36 having a second passageway 38 which is in fluid communication with an engine intake manifold 97 (FIG. 3).

The housing 12 further includes a guide member 42 having a bobbin section 44 located between upper 46 and lower 48 flanges that extend outwardly to form a substantially C-shaped configuration. The upper flange 46 is fabricated from a non-magnetic material. Alternatively, an air gap may be formed between the upper flange 46 and remaining portions of the bobbin section 44 to isolate the upper flange 46. The upper 46 and lower 48 flanges each include bearings 50 for enabling movement of a shaft 52 along an axial direction. It is noted that other devices and configurations for enabling movement may be used such as bushings. The shaft 52 includes a permanent magnet 54 that is located between the upper 46 and lower 48 flanges. A lower end 56 of the shaft 52 includes the valve element 30. In FIG. 1, the valve element 30 is depicted in an open position wherein the valve element 30 is spaced apart from the valve seat 28 to enable fluid communication between the first passageway 24, the internal passageway 18 and the second passageway 38. The valve element 30 may also be moved to a closed position wherein the valve element 30 is in contact with the valve seat 28 to thus close the inlet port 22 as will be described in relation to FIG. 2.

A wire 58 having first 60 and second 62 ends is wound around a section of the bobbin 44 to form a coil 65. The first 60 and second 62 ends are connected to first 76 and second 72 terminals, respectively. The coil 65 is located adjacent the magnet 54. In one embodiment, the magnet 54 is oriented such that the south and north magnetic poles are located adjacent first 82 and second 84 portions, respectively of the coil 65. In operation, the coil 65 is energized by maintaining the second terminal 72 at 0 volts and the first terminal 76 at a positive voltage such as approximately +12 volts, for example. The coil 65 is wound such that a magnetic field is generated having south and north magnetic poles oriented near top 82 and bottom 84 portions, respectively, of the coil 65. As a result, the polarity of the magnetic field along the bobbin 44 is oriented to repel the magnet 54, thus causing the valve element 30 to move upward to the open position as shown in FIG. 1.

Figure 2:
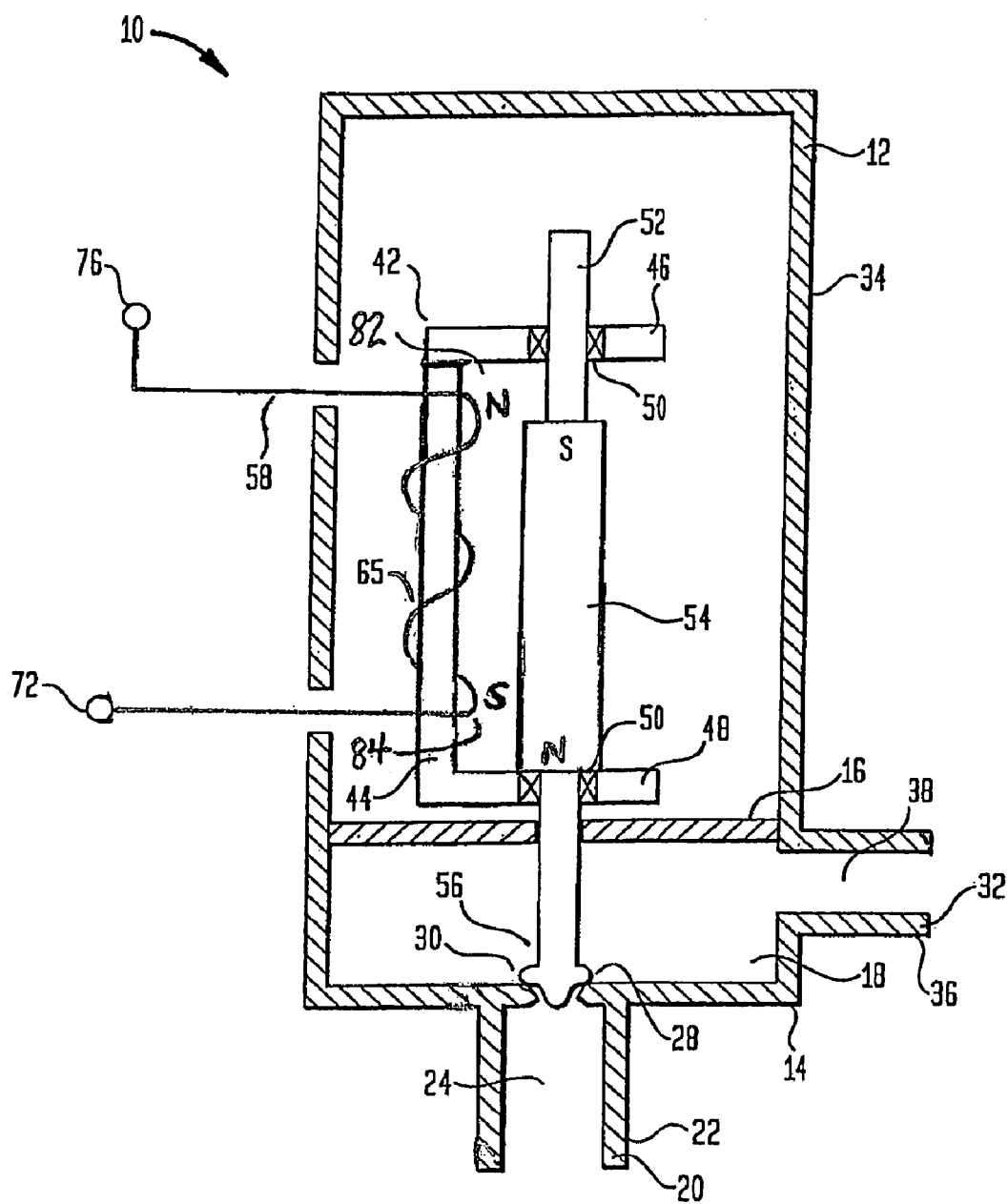
FIG. 2 is a cross sectional view of the bipolar valve having wherein the coil is energized for closing the inlet port.

Referring to FIG. 2, the valve element 30 is shown in the closed position. In order to move the valve element 30 to the closed position, the voltage applied to the first 76 and second 72 terminals is reversed. In particular, coil 65 is energized by maintaining the first terminal 76 at 0 volts and the second terminal 72 at a positive voltage such as approximately +12 volts, for example. As a result, the orientation of the magnetic poles along the bobbin 44 is reversed from that which occurs when the valve element 30 is moved to the first position so as to form a bipolar coil. Thus, a magnetic field is generated having north and south magnetic poles oriented near the top 82 and bottom 84 portions, respectively, of the coil 65. As a result, the polarity of the magnetic field along the bobbin 44 is oriented to magnetically attract the magnet 54. This causes the valve element 30 to move downward to the closed position as shown in FIG. 2.

In the second position, the magnet 54 is located so as to form a magnetic latch between the magnet 54 and the lower flange 48. This serves to maintain the valve element 30 in the closed position when the coil 65 is not energized, thus reducing the amount of power required for operating the purge valve 10. In FIG. 2, the magnet 54 is shown in contact with the lower flange 48. Alternatively, the magnet 54 may be spaced apart and located in sufficient proximity to the lower flange 48 to form the magnetic latch.

In order to move the valve element 30 back to the open position, the voltage applied to the first 76 and second 72 terminals is again reversed such that a magnetic field is generated having south and north magnetic poles oriented near top 82 and bottom 84 portions, respectively, of the coil 65 as previously described in relation to FIG. 1. The magnetic field is of sufficient strength to overcome the magnetic latch between the magnet 54 and the lower flange 48. As such, the polarity of the coil 65 may be selectively reversed to cause movement of the valve element 30 between the open and closed positions. In addition, movement of the valve element 30 between the open and closed positions is achieved without the use of a spring. It is noted that other suitable voltages may be used to energize coil 65. Further, it is noted that the polarity of the magnet 54 and that of the magnetic field generated by coil 65 may be correspondingly reversed as desired to enable movement of the valve element 30 between the open and closed positions. In one embodiment, pulse width modulation techniques may be used to control movement of the valve element 30. In another embodiment, the coil 56 may be wound around the magnet 54 to form a coaxial configuration.

Referring to FIG. 3, the purge valve 10 in accordance with the present invention is shown in an emission control system 90. The system 90 includes a leak detection monitor 92 which is used as part of a selected on board diagnostic procedure for determining whether there is an unacceptable fuel vapor leak in the system 90.

The canister 26 is in fluid communication with a fuel tank 94 and includes carbon or other similar material which serves to absorb fuel vapors that are generated within the fuel tank 94 and in the emission control system 90. The canister 26 also includes a vent solenoid valve 96 which is opened under the appropriate conditions so as to place the canister 26 in fluid communication with atmospheric air through a filter 40. Alternatively, the vent valve 96 is closed to isolate the canister 26 from atmospheric air so as to enable performance of an on board diagnostic procedure. As previously described, the principles of the present invention regarding the use of a bipolar coil may be applied to either canister purge valves or vent solenoid valves. In addition, for vent valve applications, the coil 65 may be energized to a higher level when the valve element 30 is in the closed position than in purge valve applications so as to achieve an improved seal between the valve element 30 and the valve seat 28.

The purge valve 10 is located between the canister 26 and the engine intake manifold 97 of an internal combustion engine 98. The purge valve 10 may be opened as previously described in relation to FIG. 1 to place the canister 26 in fluid communication with the intake manifold 97. Alternatively, the purge valve 10 may be closed as previously described in relation to FIG. 2 to isolate the canister 26 and the fuel tank 94 from the intake manifold 97. The opening and closing of both the purge valve 10 and the vent valve 96 is controlled by an engine electronic control unit (ECU) 99.

Under the appropriate conditions, the canister 26 is purged so that fuel vapors collected within the canister 26 do not undesirably escape into the atmosphere. This is done by opening both the purge valve 10 and the vent valve 96, thus enabling vacuum which is present at the intake manifold 97 to draw in atmospheric air through the canister 26 and then draw out the fuel vapors from the canister 26. The purged fuel vapors are then used in the normal combustion process. The ECU 99 determines when purging is to occur based on received signals indicative of various engine parameters. Further, the ECU 99 may be programmed to allow purging of the canister 26 at differential rates depending upon the prevailing engine operating conditions. As such, greater amounts of purging may be permitted at certain times while at other times lesser amounts may be allowed.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A solenoid for use in a valve, comprising:
   a housing having an inlet port and an outlet port;
   a guide element located in said housing, said guide element including a bobbin section;

a valve shaft slidably mounted to said guide element, said valve shaft having a permanent magnet and a valve element wherein said valve element is movable between a closed position wherein said inlet port is closed and an open position wherein said inlet port is opened; and a coil formed on said bobbin adjacent said magnet, wherein said coil generates a first magnetic field having a first polarity that is oriented to move said valve element to said open position and wherein said coil generates a second magnetic field having a second polarity that is oriented to move said valve element to said closed position.

2. The solenoid according to claim 1, wherein an orientation of magnetic poles generated by said first magnetic field relative to said second magnetic field is reversed.

3. The solenoid according to claim 1, wherein a voltage of approximately 12 volts is applied to a first terminal of said coil.

4. The solenoid according to claim 1, wherein a voltage of approximately 12 volts is applied to a second terminal of said coil.

5. The solenoid according to claim 1, wherein a magnetic latch is formed between said bobbin and said magnet.

6. The solenoid according to claim 1, wherein a portion of said bobbin is fabricated from a nonmagnetic material.

7. A method for operating a valve, comprising the steps of:
providing a housing having a inlet port and an outlet port;
providing a valve shaft having a permanent magnet and a valve element, wherein said valve element is movable between a closed position wherein said inlet port is closed and an open position wherein said inlet port is opened;
a coil generating a first magnetic field having a polarity that is oriented to cause said magnet to be repelled to move said magnet and thus said valve element to said open position; and
said coil generating a second magnetic field having a reverse polarity that is oriented to cause a magnetic attraction with said magnet to move said magnet and thus said valve element to said closed position.

8. The method according to claim 7, wherein a voltage of approximately 12 volts is applied to a first terminal of said coil to generate said first magnetic field.

9. The method according to claim 7, wherein a voltage of approximately 12 volts is applied to a second terminal of said coil to generate said second magnetic field.

10. An evaporative emission control system, wherein said system is in fluid communication with a fuel tank that generates fuel vapors, comprising:

a vapor collection canister in fluid communication with said fuel tank for absorbing fuel vapors in said system;

a vent valve in fluid communication with said canister for enabling venting of said canister to atmosphere;

a leak detection monitor for determining whether there are leaks in said system which are greater than a predetermined level;

a canister purge valve which further comprises:
a housing having an inlet port in fluid communication with said canister and an outlet port in fluid communication with an intake manifold of an engine;
a guide element located in said housing, said guide element including a bobbin section;
a valve shaft slidably mounted to said guide element, said valve shaft having a permanent magnet and a valve element wherein said valve element is movable between a closed position wherein said inlet port is closed and an open position wherein said inlet port is opened;
a coil formed on said bobbin adjacent said magnet, wherein said coil generates a first magnetic field having a polarity that is oriented to cause said magnet to be repelled to move said valve element to said open position and wherein said coil generates a second magnetic field having a polarity that is oriented to cause a magnetic attraction with said magnet to move said valve element to said closed position; and
an electronic engine control unit for controlling opening and closing of said vent valve and said canister purge valve to enable purging of said canister and performance of an on board diagnostic procedure.

11. The solenoid according to claim 10, wherein an orientation of magnetic poles generated by said first magnetic field relative to said second magnetic field is reversed.

12. The solenoid according to claim 10, wherein a voltage of approximately 12 volts is applied to a first terminal of said coil.

13. The solenoid according to claim 10, wherein a voltage of approximately 12 volts is applied to a second terminal of said coil.

14. The system according to claim 10 further including bearings for enabling movement of said valve shaft.

15. The system according to claim 10 further including a filter in fluid communication with said vent valve.

16. The solenoid according to claim 10, wherein a magnetic latch is formed between said bobbin and said magnet.

17. The solenoid according to claim 10, wherein a portion of said bobbin is fabricated from a nonmagnetic material.

* * * * *